Dec. 16, 1930.  C. T. MORSE ET AL  1,785,453
DUST COLLECTION
Filed Aug. 15, 1927    4 Sheets-Sheet 1

Inventors
CLARK T. MORSE,
EDWARD L. HOGAN,
BY Toulmin & Toulmin
Attorneys

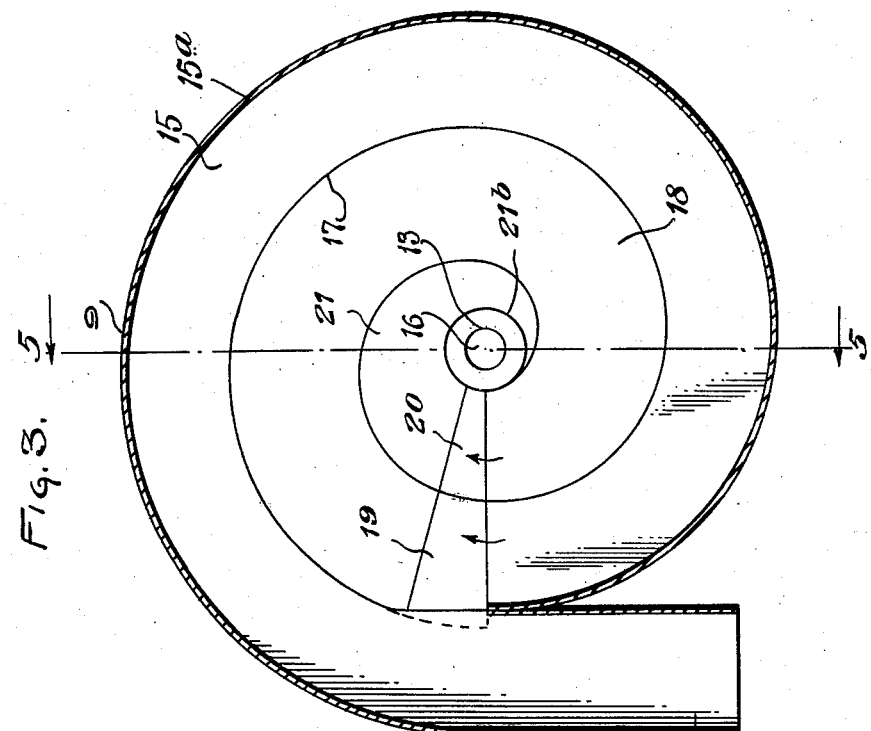
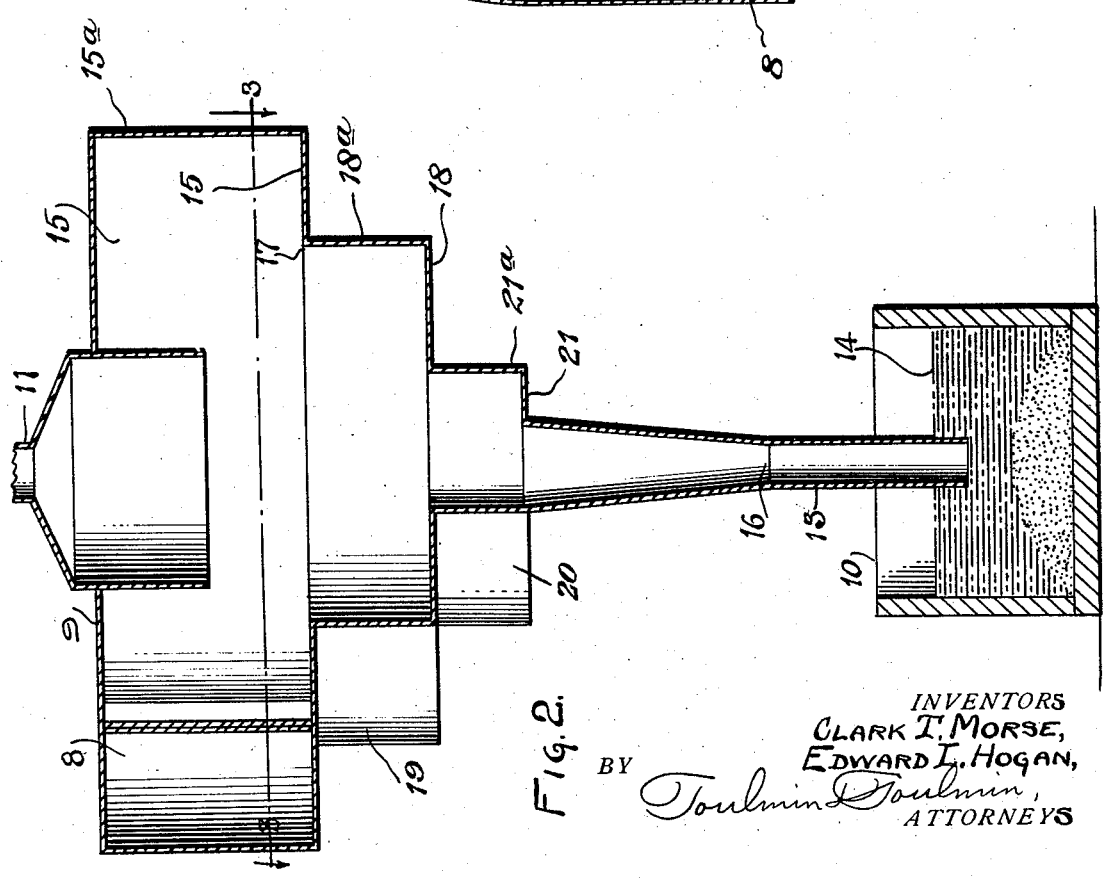

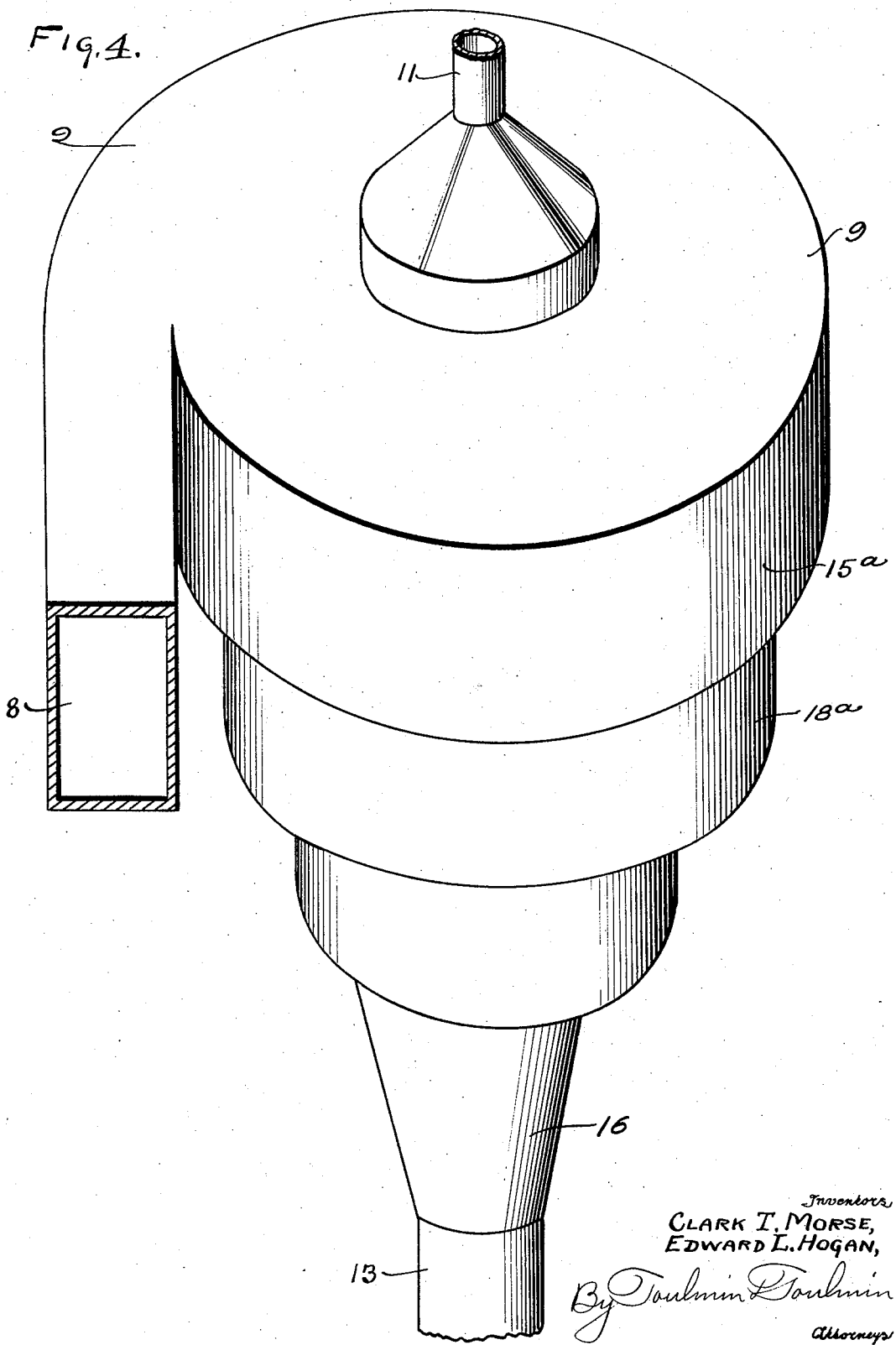

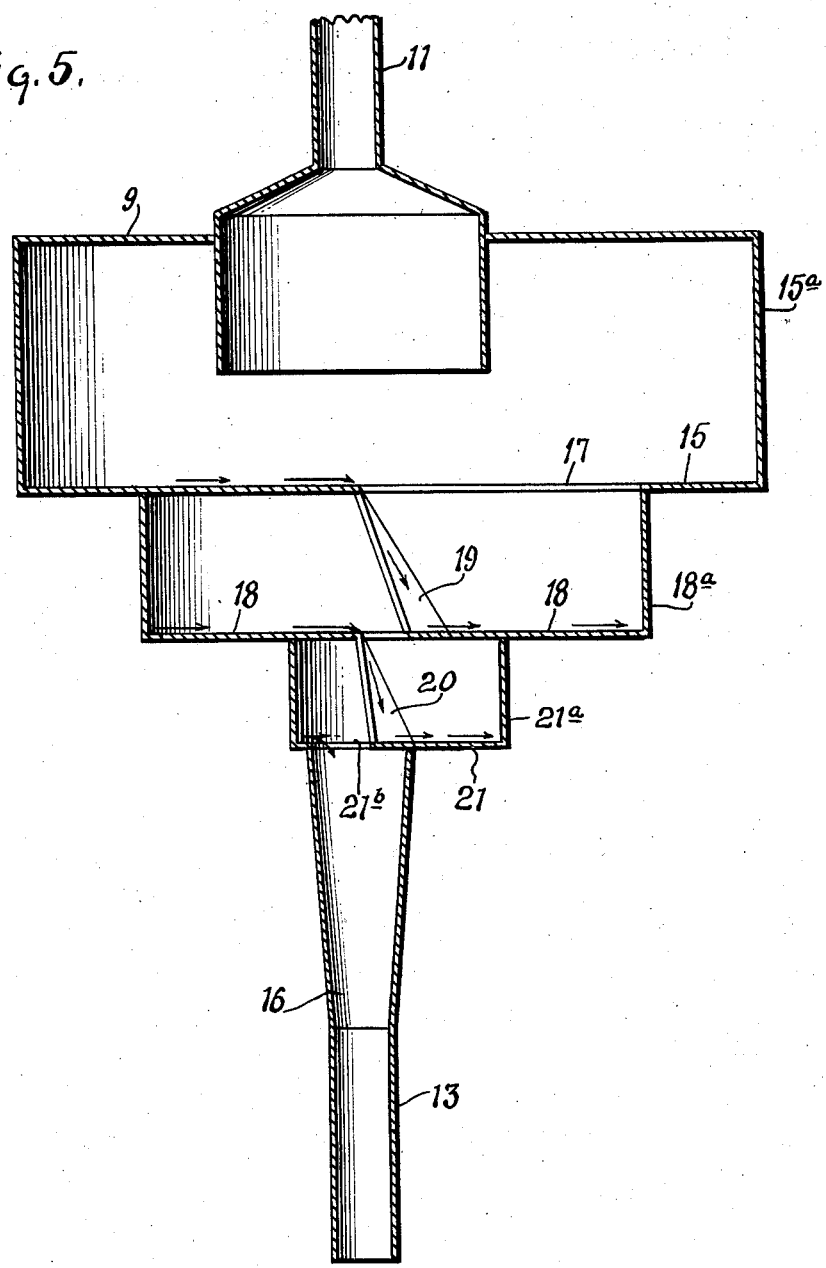

Patented Dec. 16, 1930

1,785,453

UNITED STATES PATENT OFFICE

CLARK T. MORSE AND EDWARD L. HOGAN, OF DETROIT, MICHIGAN, ASSIGNORS, BY MESNE ASSIGNMENTS, TO AMERICAN BLOWER CORPORATION, OF DETROIT, MICHIGAN, A CORPORATION OF DELAWARE

DUST COLLECTION

Application filed August 15, 1927. Serial No. 212,892.

Our invention relates to dust collecting.

It is the object of our invention to provide means and a method of collecting dust in wet precipitate form from blast furnaces in order to provide clean gas for combustion purposes in furnaces and the like without having the dust contents injure the refractory work of boilers by imparting a glaze thereto.

It is our particular object to provide wet precipitate and collection of the dust laden gases in such a manner that the liquids and the dust will always move in a continuous unbroken path so that the moisture or the lighter dust particles will not be broken off and blown away from the main stream and carried away with the clean gases which make their exit upon the reversal of direction necessary in their exit movement from the main body of the dust laden and moisture laden gas.

Referring to the drawings:

Figure 2 is a vertical section through our form of collector adapted to this particular purpose, although a variety of forms may be employed if embodying the principle of our method and apparatus;

Figure 3 is a section on the line 3—3 of Figure 2;

Figure 4 is a perspective showing the continuous path for the unbroken stream of dust and liquid.

Figure 5 is a section on the line 5—5 of Figure 3 looking in the direction of the arrows to show the ramp construction by which the dust stream moves from the successive horizontal platforms.

Figure 1:
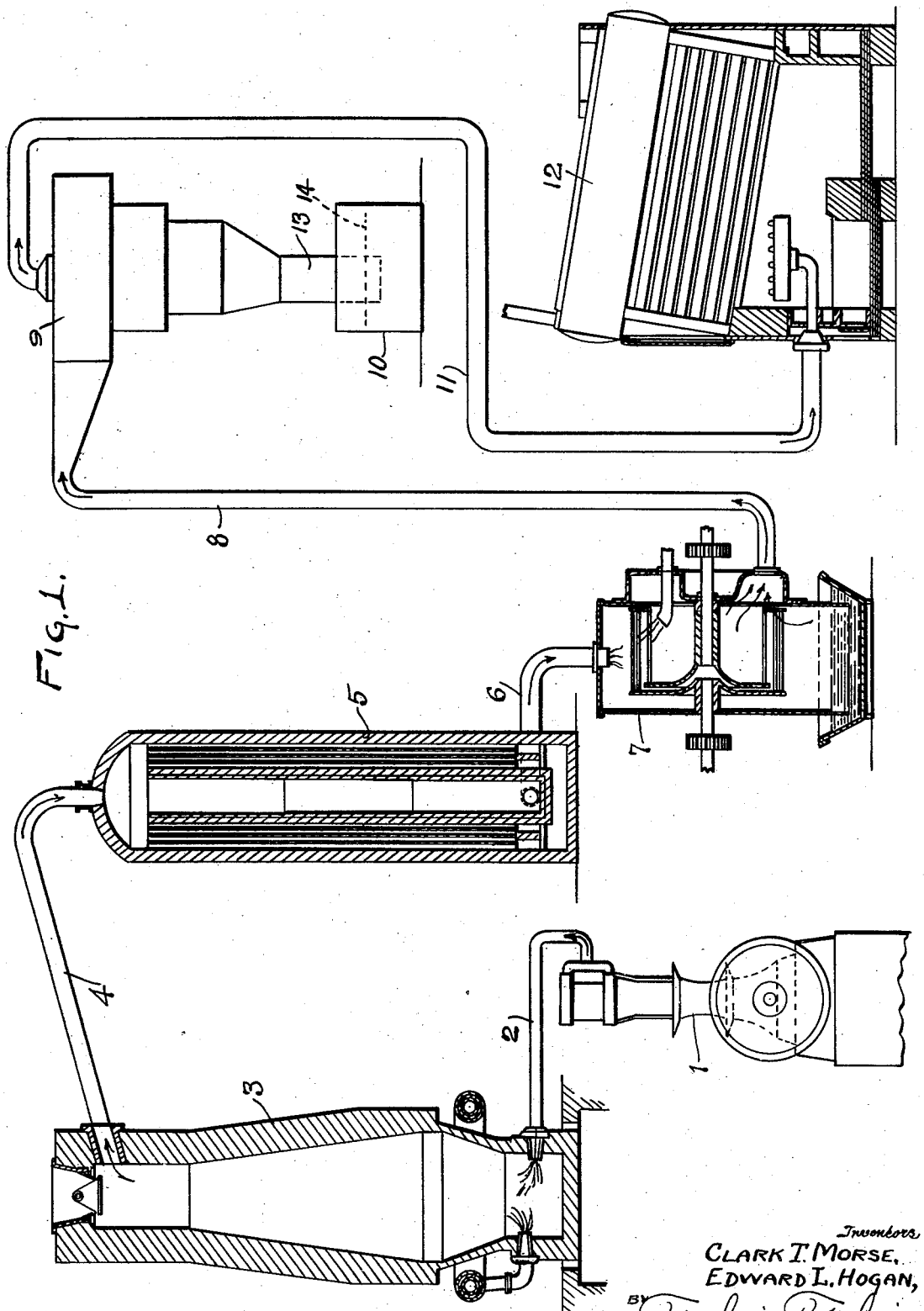
Figure 1 is a diagrammatic view of our invention adapted to blast furnace apparatus.

Referring to the drawings in detail, 1 designates a blowing engine, which supplies a blast of air through the pipe 2 to the blast furnace 3. The blast furnace gases make their exit through the pipe 4 into the stove or air heater 5 where the gases give up a portion of their heat and then pass through the passageway 6 into the disintegrator 7 where the gases are thoroughly incorporated with water so that the gases emerge through the pipe 8 in a saturated condition, the dust particles being associated with moisture.

This moisture laden dust passes with the gas which supports and carries it at a predetermined speed into the collector 9. This collector collects and precipitates the moisture laden dust, which passes downwardly after having been precipitated on the inside of the outside wall of the collector 9 and under the influence of gravity such wet dust particles descend into the hopper 10 whence they are removed in either dry, moist or wet condition. The dust so collected may be used again, after proper treatment, in the blast furnace process.

The clean gases pass upwardly through the vent pipe 11 to any storage container or beneath the boiler, shown diagrammatically at 12. Heretofore, the gases with their burden of dust would cover the brick of the boiler and soon glaze it so that its effective condition would be materially interfered with.

The dust particles laden with moisture being heavier collect on the inside of the wall of the collector and then having lost their speed drop down under the influence of gravity into the hopper 10.

The collector is preferably a scroll, the entrance pipe 8 being of the same depth as the depth of the scroll.

It will be realized that the passage of the air through the air heater is not necessary but is one of the proper and essential steps in blast furnace practice, to which our invention is readily adaptable.

Our invention consists essentially of the steps of incorporating dust laden gas with a saturation of moisture, so that the particles of dust may associate with them the requisite moisture to segregate them and increase their weight, and the extraction of the moisture and dust together.

It is obvious that various forms of moisture apparatus may be employed and under some conditions a spray injector adjacent to or in the collector may be sufficient for the purpose, but we prefer to employ for this purpose the conventional disintegrator customary in blast furnace practice.

The moisture laden dust particles are collected in the scroll by the combined action of centrifugal force and gravity, while the clean gas rises vertically through the center of the collector.

Our collector is particularly adaptable to these conditions of operation, and, while we do not desire to be confined to any particular type of collector, yet this particular form is preferred.

The lower end of the collector terminates in a tube 13, while the hopper 10 is preferably filled with liquid at the point 14 below which the open mouth of the pipe 13 extends, so that there is a closed connection between the collector and the collecting hopper or tank, which is preferable to prevent any air being sucked in through the pipe 13 and carried vertically through the collector, thus interfering with the operation of the collector and the centrifugal and gravity method of collection of the wet precipitate.

The passageway 8 enters the scroll at the full depth of the scroll and at the full width of the continuous spiral passageway in the scroll designated 15 which is adjacent to the wall of the collector and moves inwardly and downwardly in a spiral of decreasing diameter until it terminates adjacent the opening 16 of the passageway 13 which leads to the hopper 10.

The reason for preferably employing the passageway 8, which is the full depth and the full width of the initial platform 15 is that it is desirable to maintain the full speed of the moisture laden dust gas stream until the centrifugal effect upon the moisture laden dust can be secured, as the greater the speed the greater the effect of the centrifugal force to effect the extraction of the moisture laden dust from the gas stream and its consolidation into its own dust stream. Any reduction of the area either vertically or laterally of the passageway 8 would set up a back pressure with consequent reduction in gas speed with a consequent reduction in efficiency.

It is obvious that this result may be accomplished by separate floors connected by ramps or by a continuously descending track or platform 15, the object being to leave the center of the scroll open in a cone of decreasing diameter into which the dust free air may be discharged and up through which it may pass in the reverse direction from that in which the wet precipitate is moved. The platform or track 15 must be of sufficient width to easily accommodate the body of liquid and dust in the form of a wet precipitate in order that this stream of liquid and dust may not overhang the edge 17 of this platform, because if it should overhang the centrally located, upwardly moving stream of dust free air, it would engage with it, break off a part of it and carry it out with it so as to defeat the object of securing a dust free and moisture free stream.

When the moisture laden dust is moved in a horizontal plane on the platform 15 for approximately a revolution the moisture laden dust stream has had a chance to consolidate itself near the outer edge of the platform 15 against the wall 15a, so that it can be easily removed in a body to the next lower horizontal platform 18 which is connected to the platform 15 by the ramp 19. Thus the dust stream is conveyed with such air that is still associated with it in an unbroken body from one horizontal platform, such as 15, to the next lower horizontal platform 18 by means of the connecting ramp 19. The movement for approximately a revolution of the dust stream gives the centrifugal force an opportunity to consolidate the dust stream to prevent it fraying or breaking up as it is moved by the air from which it is being extracted. This fraying or breaking up must be prevented and any abrupt change of direction must be prevented because, otherwise, the dust stream will be distributed again in the air and the collection operation will be defeated.

When the dust stream has descended to the platform 18 by the ramp 19 it then makes a substantially complete revolution of similar diameter as a platform 18 is laid out as a part of the descending spiral path or passageway of which 15 is the first stage and of which the ramp 19 is an intermediate stage between the platform 15 and the platform 18.

The dust stream having passed around the platform 18 and being thrown up against the wall of the collector 18a reaches the ramp 20 whence it passes down on to the next lower platform 21 where it travels in a spiral path of decreasing diameter but still on a horizontal plane until the decreasing diameter of the platform 21 leads the dust stream into the passageway 16 and passageway 13 into the container 10. It will be noted as a characteristic of these several superimposed horizontal platforms 15, 18 and 21 that they extend approximately a revolution, that they are horizontal, that they are interconnected by ramps so as not to interfere with the continuity of the stream and that their areas form a part of a continuous descending spiral track for conveyance of the dust stream as a continuous body and that they are of constantly decreasing diameter so that the final platform 21 finally brings its outer edge where the dust stream is collected by centrifugal force against the outer wall 21a until the outer wall coincides with the inner edge 21b. When these two edges so coincide the dust stream then passes down by gravity into the passageway 16 and passageway 13.

The characteristics of this method and apparatus are:—The movement of the moisture laden dust with the gas stream or air stream for approximately a revolution is a continuous body forming the body by centrifugal force on the outer edge of a horizontal platform of the collector and against the outer wall of the casing adjacent that platform; that this consolidated stream is never broken but is laid continuously down to the next horizontal platform of decreasing diameter by a ramp. Again, the dust is re-consolidated in a smaller area or in a stream of smaller diameter collecting more and more of the moisture laden dust into the stream; and that eventually the line of collection which is along the outer wall of the casing adjacent each horizontal platform coincides with the center gravity chute to allow the moisture laden dust to drop into its hopper. Thus, the two essentials of continuity of the moisture laden dust stream and the succession of horizontal collecting areas are secured. It has been found that high efficiency in handling moisture laden dust can be secured by not disturbing the horizontal movement of the moisture laden dust during collection, but it is desirable to allow the moisture laden dust to consolidate into a stream and then move it to the next lower plane without changing its direction but gradually move it closer and closer to the center of the collector. This prevents what is known as fraying or blowing and churning of the dust. Full advantage of the moisture content of the dust can be taken advantage of by these successive stages of consolidation of the dust stream.

It is desirable to extract not only the dust but also the moisture so that a dry combustible gas may be supplied for the usual purposes in steel mills.

In our invention, the essence of the idea is to incorporate moisture, preferably at the point of saturation, with the dust laden gases so that particles of moisture will be incorporated with or surround particles of dust; then these weighted dust particles are collected centrifugally within the confines of the track 15 and the moist body of dust, with varying amounts of liquid contained depending upon the dust and the treatment thereof with the liquid, will move as a continuous stream against the inner wall of the scroll in a decreasing spiral path which descends to the hopper.

It will be understood that we desire to comprehend within our invention such modifications as may be clearly embraced within our claims and within the scope of our invention.

Having thus fully described our invention, what we claim as new and desire to secure by Letters Patent, is:—

1. In a method of dust collection, incorporating moisture with a dust laden gas stream, subjecting the stream to centrifugal action comprising moving the dust and moisture in a continuous path, extracting the clean gas therefrom by moving the dust laden gas in a horizontal path for approximately a revolution, conveying it to a next lower horizontal level, again moving it in a horizontal plane in a path of lesser diameter than that of the first, said path becoming increasingly closer to the center of revolution of the stream and continuing this operation until said center of the stream is reached, and dropping the moisture laden dust by gravity downwardly through the center of the stream and discharging the dust free gas upwardly in a path which is the prolongation of the central portion of the stream.

2. In a method of dust collection, incorporating moisture with a dust laden gas stream, subjecting the stream to centrifugal action comprising moving the dust and moisture in a continuous path and extracting the clean gas therefrom, said continuous path being a descending spiral of constantly decreasing diameter but moving at intervals in a spiral the dust laden stream in horizontal planes to enable the moisture laden dust to consolidate itself in a stream on the outer edge of the spiral before moving downwardly in the descending spiral path of the next lower level, the dust and moisture free gases being adapted to move upwardly and outwardly in a direction the reverse of the downward movement of the moisture and dust.

3. In a method of collecting dust free gases, incorporating moisture with the dust and gases, collecting the dust and moisture from the gases by centrifugal action comprising moving the dust and moisture in a continuous path downwardly by gravity in an unbroken stream, maintaining the stream at intervals in successive horizontal planes for approximately a revolution to consolidate moisture laden dust before conveying to the next lower level, and moving the dust free gases vertically under pressure sufficient to move the free gases vertically away from the moisture laden dust but not under sufficient pressure to cause the moisture laden dust to rise with the gases and to counteract the effect of gravity on the descending moisture laden dust collected from the dust stream.

4. In combination, means for incorporating moisture with dust laden gases, means to deliver the dust laden and moist gases under pressure into a collector, a collector having a series of sections of decreasing radii with annular platforms communicating with the hopper, said annular platforms consisting of a plurality of horizontal portions of substantially a revolution in length and ramps interconnecting said platforms one with the other in order to provide a continuous surface over which the dust laden gases may flow from one level to the other in a continuous descending spiral path, a hopper, and a gas outlet for dust free gases located in the part of said collector opposite said hopper.

5. In combination, means for incorporating moisture with dust laden gases, means to deliver the dust laden gases under pressure into a collector, a collector having a series of successive sections of descending radii with annular platforms communicating with the hopper, said annular platforms consisting of a plurality of horizontal portions of substantially a revolution in length and ramps interconnecting said platforms one with the other in order to provide a continuous surface over which the dust laden gases may flow from one level to the other in a continuous descending spiral path, a hopper, and a gas outlet for dust free gases located on the top of said collector opposite said hopper, said collector being provided within said platforms with a conical open area for the escape of the dust and moisture free gases upwardly and centrally.

6. In combination, means for incorporating moisture with gases, means for collecting by centrifugal action the moisture and dust as a body, said means consisting of a plurality of horizontal platforms one below the other connected by ramps, each of said platforms being surrounded by outer walls, the platforms being of decreasing diameters so that the point where one platform is connected by a ramp to the next lower platform is closer to the center of the collector means than the entrance portion of the platform, and means for conveying away the moisture laden dust from the lowermost platform, the terminus of that platform at the end of a substantial revolution merging into the means for conveying away the dust so that the dust may drop from the last platform by gravity into the conveying-away means, and means for extracting the clean gases.

In testimony whereof, we affix our signatures.

CLARK T. MORSE.
EDWARD L. HOGAN.